United States Patent
Mori

(10) Patent No.: US 12,106,012 B2
(45) Date of Patent: Oct. 1, 2024

(54) INFORMATION PROCESSING DEVICE, VEHICLE, AND INFORMATION PROCESSING METHOD

(71) Applicant: TOYOTA JIDOSHA KABUSHIKI KAISHA, Toyota (JP)

(72) Inventor: Koki Mori, Inuyama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 135 days.

(21) Appl. No.: 17/840,706

(22) Filed: Jun. 15, 2022

(65) Prior Publication Data

US 2023/0004341 A1 Jan. 5, 2023

(30) Foreign Application Priority Data

Jul. 5, 2021 (JP) ................. 2021-111246

(51) Int. Cl.
| | | |
|---|---|---|
| G06F 3/16 | (2006.01) | |
| G08B 25/12 | (2006.01) | |
| H04R 1/02 | (2006.01) | |
| H04R 1/40 | (2006.01) | |
| H04R 3/12 | (2006.01) | |
| H04W 4/80 | (2018.01) | |
| B60K 35/10 | (2024.01) | |

(52) U.S. Cl.
CPC ............. *G06F 3/165* (2013.01); *G08B 25/12* (2013.01); *H04R 1/025* (2013.01); *H04R 1/403* (2013.01); *H04R 3/12* (2013.01); *H04W 4/80* (2018.02); *B60K 35/10* (2024.01); *H04R 2430/01* (2013.01); *H04R 2499/13* (2013.01)

(58) Field of Classification Search
CPC .......... H04R 1/403; H04R 1/025; H04R 3/12; H04R 2430/01; H04R 2499/13; H04R 5/04; G06F 3/165
USPC .......................... 381/71.4, 86, 365, 389, 109
See application file for complete search history.

(56) References Cited

U.S. PATENT DOCUMENTS

| | | | | |
|---|---|---|---|---|
| 9,538,300 B2* | 1/2017 | Sheen | .................... | H04R 27/00 |
| 10,514,884 B2* | 12/2019 | Mathur | .................... | H04R 3/00 |
| 10,925,342 B2* | 2/2021 | Hui | .......................... | G06F 3/048 |
| 11,184,721 B2* | 11/2021 | Millington | .............. | G06F 3/165 |
| 11,457,345 B2* | 9/2022 | Mgbenka | ............... | G08B 25/12 |
| 2005/0153680 A1 | 7/2005 | Yoshioka et al. | | |
| 2009/0245533 A1 | 10/2009 | Gerlach | | |
| 2023/0007376 A1* | 1/2023 | Sheen | ..................... | H04R 3/00 |

FOREIGN PATENT DOCUMENTS

| | | |
|---|---|---|
| JP | 2004-320582 A | 11/2004 |
| JP | 2006-254285 A | 9/2006 |
| JP | 2016-030481 A | 3/2016 |

* cited by examiner

*Primary Examiner* — Disler Paul
(74) *Attorney, Agent, or Firm* — Sughrue Mion, PLLC

(57) ABSTRACT

A vehicle includes a first speaker, a data communications device, and an information processing device. The information processing device executes the followings: receiving a user operation to make a volume change of audio output from a first speaker provided in a vehicle, the user operation being input into a volume adjustment portion; and while the data communications device outputs audio from a second speaker, notifying the data communications device of the volume change made by the user operation input into a volume adjustment portion.

11 Claims, 6 Drawing Sheets

INFORMATION PROCESSING DEVICE, VEHICLE, AND INFORMATION PROCESSING METHOD

CROSS-REFERENCE TO RELATED APPLICATION

This application claims priority to Japanese Patent Application No. 2021-111246 filed on Jul. 5, 2021, incorporated herein by reference in its entirety.

BACKGROUND

1. Technical Field

This disclosure relates to an information processing device, a vehicle, and an information processing method.

2. Description of Related Art

A vehicle emergency call device configured to transmit an emergency call signal to a control center outside a vehicle when the occurrence of an accident is detected is disclosed (for example, Japanese Unexamined Patent Application Publication No. 2016-030481 (JP 2016-030481 A)).

SUMMARY

An object of this disclosure is to provide an information processing device, a vehicle, and an information processing method each of which can change, by a user operation, the volume of audio output by a data communications device through a speaker.

One aspect of this disclosure is an information processing device including a controlling portion. The controlling portion is configured to execute the followings: receiving a user operation to make a volume change of audio output from a first speaker provided in a vehicle, the user operation being input into a volume adjustment portion; and while a data communications device outputs audio from a second speaker, notifying the data communications device of the volume change made by the user operation input into the volume adjustment portion.

Another aspect of this disclosure is a vehicle including a first speaker, a data communications device, and an information processing device. The information processing device is configured to execute the followings: receiving a user operation to make a volume change of audio output from the first speaker, the user operation being input into a volume adjustment portion; and while the data communications device outputs audio from a second speaker, notifying the data communications device of the volume change made by the user operation input into the volume adjustment portion.

Another aspect of this disclosure is an information processing method includes: an information processing device receiving a user operation to make a volume change of audio output from a first speaker provided in a vehicle, the user operation being input into a volume adjustment portion; and while a data communications device outputs audio from a second speaker, the information processing device notifying the data communications device of the volume change made by the user operation input into the volume adjustment portion.

With this disclosure, it is possible to change, by a user operation, the volume of audio output by a data communications device through a speaker.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
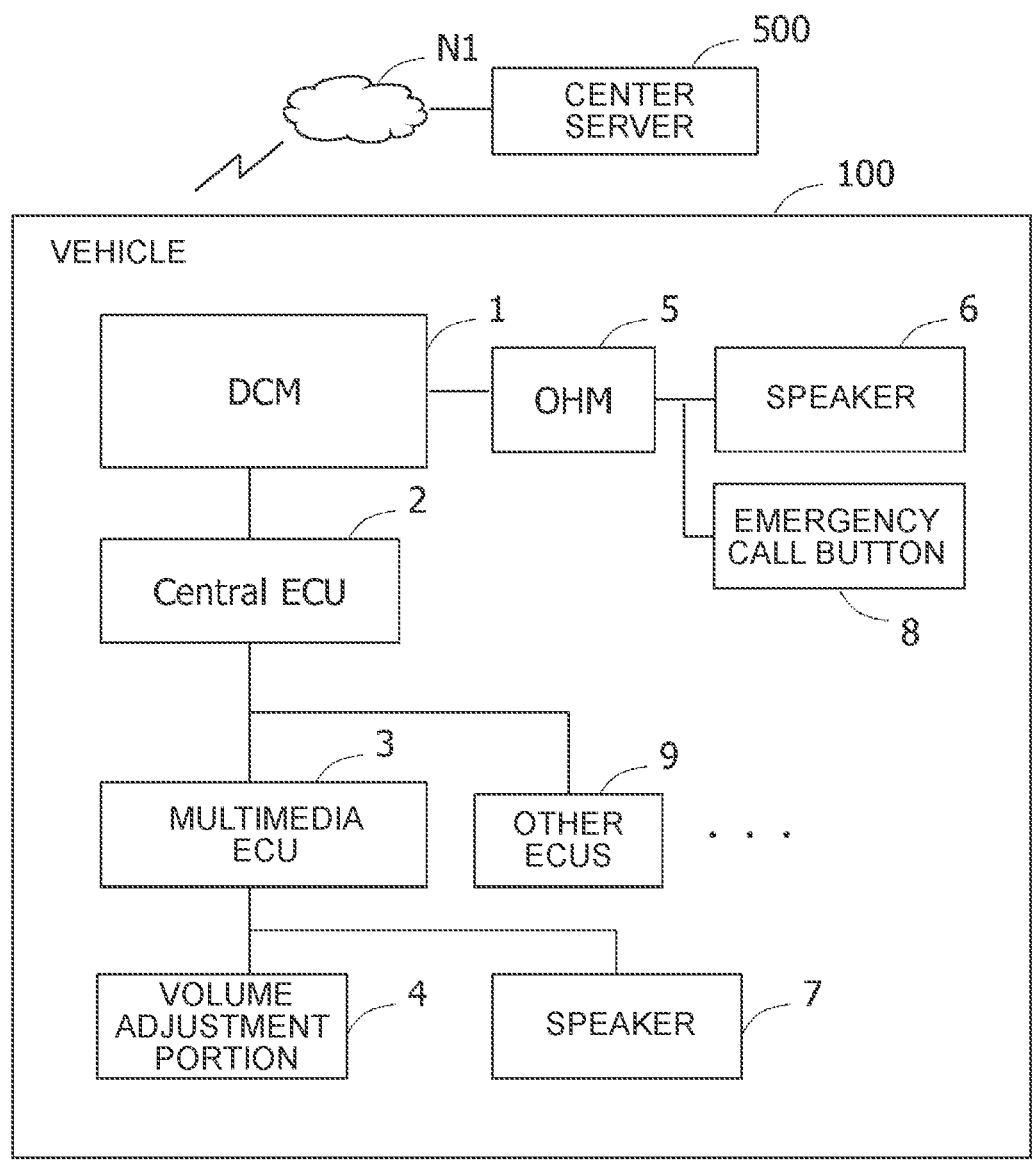
FIG. 1 is a view illustrating one example of a system configuration of a vehicle according to a first embodiment.

A connected car having a communication function includes a communicable data communications device. The data communications device can provide various services to a user in a vehicle by communicating with an external device. While the data communications device provides services by communicating with the external device, the data communications device may receive audio data and output audio corresponding to the audio data from a speaker inside the vehicle. However, the data communications device does not include an interface by which the user can directly adjust the volume of the audio, and therefore, it is difficult to adjust, by a user operation, the volume of the audio output by the data communications device from the speaker.

In one aspect of this disclosure, while a data communications device outputs audio from a speaker provided in a vehicle, an information processing device connected to a volume adjustment portion notifies the data communications device of a user operation input into the volume adjustment portion. This allows the user operation to change the volume of the audio output by the data communications device from the speaker.

More specifically, one aspect of this disclosure relates to an information processing device provided in a vehicle. The information processing device includes a controlling portion. The information processing device is, for example, an electronic control unit (ECU) configured to control multimedia in the vehicle. The controlling portion is a processor provided in the ECU, for example.

The controlling portion receives a user operation to make a volume change of audio output from a first speaker provided in the vehicle, the user operation being input into a volume adjustment portion. The volume adjustment portion is any of a button, a switch, a knob, a button displayed on a touchscreen display, and the like that are configured to adjust the volume, for example. However, the volume adjustment portion is not limited to them. While the data communications device outputs audio from a second speaker, the controlling portion notifies the data communications device of the volume change made by the user operation input into the volume adjustment portion.

The data communications device outputs audio from the second speaker. The second speaker may be the first speaker or a speaker different from the first speaker. In a case where the second speaker is a speaker different from the first speaker, the second speaker is directly or indirectly connected to the data communications device, for example, and the second speaker is a speaker configured to output audio corresponding to audio data output from the data communications device. In a case where the second speaker is the same speaker as the first speaker, the data communications device shares the first speaker with other devices in the vehicle such as the information processing device and outputs audio from the first speaker.

The controlling portion is connected to the volume adjustment portion. Accordingly, while audio is output from the first speaker, the controlling portion changes the volume of the audio output from the first speaker in accordance with the volume change made by the user operation input into the volume adjustment portion. In the meantime, the data communications device is not connected to the volume adjustment portion. Accordingly, in the related art, the adjustment of the volume by the user operation input into the volume adjustment portion does not affect the data communications device in either of a case where the second speaker is the same speaker as the first speaker and a case where the second speaker is a speaker different from the first speaker.

However, in one aspect of this disclosure, the controlling portion notifies the data communications device of the volume change made by the user operation input into the volume adjustment portion. Hereby, the data communications device changes the volume of the audio output from the second speaker in accordance with the notified volume change made by the user operation, and the data communications device outputs, to the speaker, the audio the volume of which is changed. Accordingly, with the one aspect of this disclosure, it is possible to change, by the user operation, the volume of the audio output by the data communications device from the speaker.

In one aspect of this disclosure, in a case where the data communications device starts to output audio, the data communications device may output a notification of the audio output start to an information processing device. In a case where the information processing device receives the notification of the audio output start from the data communications device, the information processing device may start to notify the data communications device of the volume change made by the user operation input into the volume adjustment portion. Hereby, a target of the volume change made by the user operation input into the volume adjustment portion can be changed from the information processing device to the data communications device.

The data communications device can communicate with an external device. In a case where the data communications device starts to communicate with the external device, the data communications device may output the notification of the audio output start to the information processing device. This is because, as one example of a case where the data communications device outputs audio, there is such a case where audio data is received from the external device via communication.

In a case where the data communications device detects an emergency event, for example, the data communications device may start to communicate with the external device. The emergency event is detected even in a case where a collision is detected by another device in the vehicle, for example. Alternatively, the data communications device may include an emergency call button, and when the emergency call button is pressed down, the data communications device may start to communicate with the external device. Hereby, in a case where an emergency event occurs, it is possible to change, by the volume adjustment portion, the volume of the audio output from the data communications device.

In one aspect of this disclosure, in a case where the data communications device ends the output of the audio, the data communications device may output a notification of the audio output end to the information processing device. In a case where the information processing device receives the notification of the audio output end from the data communications device, the information processing device may stop notifying the data communications device of the volume change made by the user operation input into the volume adjustment portion. Hereby, a target of the volume change made by the user operation input into the volume adjustment portion can be changed from the data communications device to the information processing device.

Another aspect of this disclosure relates to a vehicle including a first speaker, a data communications device, and an information processing device. The volume adjustment portion receives input of a user operation to make a volume change of audio output from the first speaker. The data communications device is not connected to the volume adjustment portion. The information processing device is connected to the volume adjustment portion, and while the data communications device outputs audio from the second speaker, the information processing device notifies the data communications device of the volume change made by the user operation input into the volume adjustment portion.

Another aspect of this disclosure may be specified as an information processing method including the above process to be executed by the information processing device, and an information processing method including the above processes to be executed by the information processing device and the data communications device. Further, another aspect of this disclosure can be specified as a program causing the information processing device to execute the above process and a computer-readable non-transitory recording medium in which the program is stored.

The following describes an embodiment of this disclosure with reference to the drawings. A configuration of the following embodiment is an example, and this disclosure is not limited to the configuration of the embodiment.

First Embodiment

FIG. 1 is a view illustrating one example of a system configuration of a vehicle 100 according to a first embodiment. The vehicle 100 includes a data communication module (DCM) 1, a central ECU (hereinafter referred to as C-ECU) 2, a multimedia ECU 3, a volume adjustment portion 4, an overhead module (OHM) 5, a speaker 6, a speaker 7, an emergency call button 8, and other ECUS 9. Note that, in FIG. 1, only a hardware configuration related to a process according to the first embodiment is extracted and illustrated. The vehicle 100 also includes various ECUS other than the C-ECU 2 and the multimedia ECU 3 and has other hardware configurations related to running.

The DCM 1 is a device configured to communicate with an external device. The DCM 1 is, for example, a computer. The DCM 1 is connected to a network N1 via wireless communication and communicates with a center server 500 via the network N1. The center server 500 is a server managed by a manufacturer of the vehicle 100, for example. The center server 500 communicates with the DCM 1 and provides, to an occupant of the vehicle 100, services such operation by audio of an operator, navigation, and an emergency call. The network N1 is a public network such as the Internet, for example.

The DCM 1 is connected to the OHM 5. The OHM 5 is connected to the speaker 6 and the emergency call button 8, for example. However, the OHM 5 is not limited to this, and the OHM 5 is also connected to a microphone or the like in addition to the speaker 6, for example. The OHM 5 is an ECU configured to control the speaker 6, the emergency call button 8, and so on, for example. The emergency call button 8 is a button to be pressed down when the occupant in the vehicle 100 notifies the center server 500 of an emergency event. When the emergency call button 8 is pressed down, an emergency call signal is input into the DCM 1 via the OHM 5, and the DCM 1 performs an emergency call to the center server 500. After that, the DCM 1 communicates with the center server 500, so that the occupant speaks with an operator of the center server 500, for example.

The DCM 1 is connected to the C-ECU 2. The C-ECU 2 controls each ECU connected to the C-ECU 2. The multimedia ECU 3 and the other ECUS 9 are connected to the C-ECU 2. The C-ECU 2, the DCM 1, and the multimedia ECU 3 are connected via a controller area network (CAN), Ethernet (registered trademark), or the like, for example.

The multimedia ECU 3 is connected to the volume adjustment portion 4 and the speaker 7, for example, and controls the volume adjustment portion 4 and the speaker 7. The multimedia ECU 3 includes, for example, a car navigation system, an audio system, and so on and outputs, inside the vehicle 100, audio of the car navigation system, the audio system, and so on via the speaker 7. The volume adjustment portion 4 is a button, a dial, a knob, or the like to be operated when a user changes the volume of the audio output from the speaker 7, for example. Further, the volume adjustment portion 4 may be a button, a dial, a knob, or the like displayed on a touchscreen display so as to be operated by the user at the time when the user changes the volume, for example.

The multimedia ECU 3 receives input of a user operation to make a volume change from the volume adjustment portion 4, changes the volume in accordance with the content of the volume change made by the user operation, and outputs the audio the volume of which is changed from the speaker 7.

The other ECUS 9 include, for example, various ECUS configured to perform controls related to running such as an engine control and a transmission control, and various ECUS configured to perform controls related to an advanced safety driving assist technology such as a collision damage mitigation brake and a pedal mis-stepping acceleration restraint device. The other ECUS 9 are connected to the C-ECU 2 via the controller area network (CAN) or Ethernet (registered trademark), for example.

In a case where audio is output, the DCM 1 outputs audio data to the OHM 5. The OHM 5 outputs the audio data input from the DCM 1 to the speaker 6. The speaker 6 converts the audio data input from the OHM 5 into audio and outputs the audio. An interface or the like such as the volume adjustment portion 4 by which a user changes the volume of the audio to be output from the speaker 6 is not directly or indirectly connected to the DCM 1. Accordingly, the volume of the audio output from the DCM 1 cannot be changed by a user operation. For example, a similar problem may be caused in a case where the speaker 6 is not provided, the DCM 1 shares a speaker with other devices, and the DCM 1 outputs audio via the speaker.

In the first embodiment, while the DCM 1 outputs audio from the speaker 6, the multimedia ECU 3 notifies the DCM 1 of a user operation to make a volume change that is input into the volume adjustment portion 4. The DCM 1 adjusts the volume of the audio data in accordance with the content of the volume change made by the user operation notified from the multimedia ECU 3, and the DCM 1 outputs the audio data the volume of which is adjusted to the OHM 5. Hereby, the volume of the audio output by the DCM 1 can be changed by the user operation.

The multimedia ECU 3 is one example of an "information processing device." The DCM 1 is one example of a "data communications device." The speaker 7 is one example of a "first speaker" and a "second speaker" in a case where the "first speaker" is the same speaker as the "second speaker." In a case where the "first speaker" and the "second speaker" are different speakers, the speaker 7 is one example of the "first speaker," and the speaker 6 is one example of the "second speaker."

Figure 2:
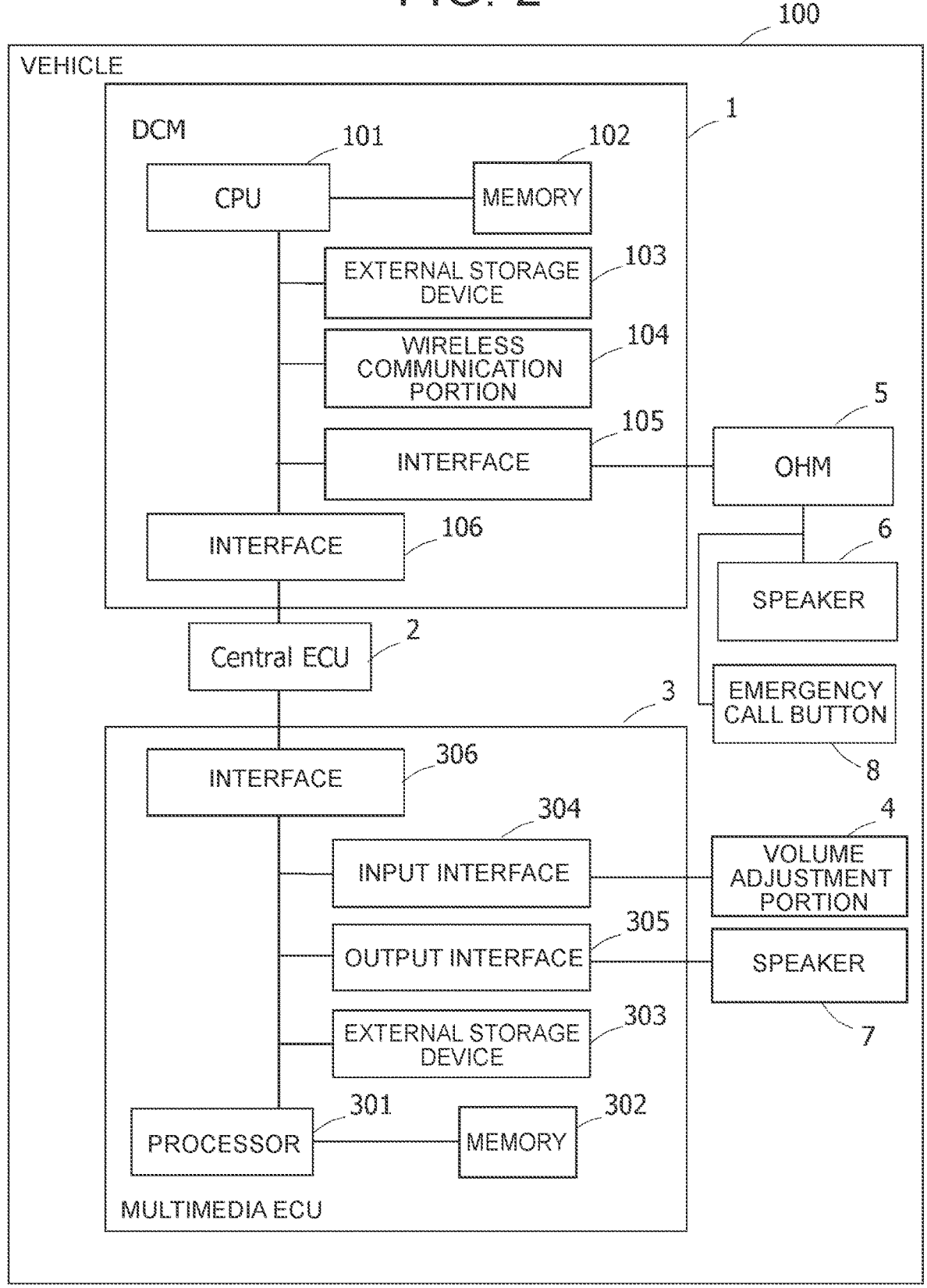
FIG. 2 illustrates exemplary hardware configurations of a DCM and a multimedia ECU.

FIG. 2 illustrates exemplary hardware configurations of the DCM 1 and the multimedia ECU 3. First, the DCM 1 includes a CPU 101, a memory 102, an external storage device 103, a wireless communication portion 104, an interface 105, and an interface 106 as the hardware configuration. The memory 102 and the external storage device 103 are recording media readable by a computer or the like.

In the external storage device 103, various programs and data to be used by the CPU 101 at the time of execution of the programs are stored. The external storage device 103 is an erasable programmable ROM (EPROM) or a hard disk drive (HDD), for example. The programs stored in the external storage device 103 include, for example, an operating system (OS), a volume adjustment program, and other various application programs.

The memory 102 is a storage device used as a buffer or configured to provide, to the CPU 101, a memory area and a working area where the programs stored in the external storage device 103 are loaded. The memory 102 includes, for example, a semiconductor memory such as a read only memory (ROM) or a random access memory (RAM).

The CPU 101 executes various processes by executing the OS and the other various application programs stored in the external storage device 103 by loading them to the memory 102. The number of the CPU 101 is not limited to one, and a plurality of CPUS 101 may be provided.

The wireless communication portion 104 is, for example, a wireless communication circuit in accordance with a mobile communication method such as 5th-Generation (5G), 6G, 4G, and Long Term Evolution (LTE) or a wireless communication method such as WiMAX and Wi-Fi. The wireless communication portion 104 is connected to the network N1 by wireless communication and enables communication with the center server 500.

The interface 105 is an interface to which the OHM 5 is connected. The interface 106 is an interface connected to the C-ECU 2. The interface 105 and the interface 106 are circuits including ports used for connection to Ethernet (registered trademark), CAN, or other networks, for example. The hardware configuration of the DCM 1 is not limited to the configuration illustrated in FIG. 2.

The multimedia ECU 3 includes, for example, a processor 301, a memory 302, an external storage device 303, an input interface 304, an output interface 305, and an interface 306 as the hardware configuration. The hardware configuration of the multimedia ECU 3 is not limited to the configuration illustrated in FIG. 2.

The processor 301 is, for example, a CPU, a micro processing unit, or a digital signal processor (DSP). The processor 301 performs various processes by executing a command of a program loaded into the memory 302. Since the memory 302 and the external storage device 303 are similar to the memory 102 and the external storage device 103, respectively, descriptions thereof are omitted. In the external storage device 303, a DCM volume adjustment program is stored, for example. The processor 301 is one example of a "controlling portion."

The input interface 304 is an interface to which the volume adjustment portion 4 is connected. The output interface 305 is an interface to which the speaker 7 is connected. The interface 306 is an interface connected to the C-ECU 2. The interface 306 is a circuit including ports used for connection to Ethernet (registered trademark), CAN, or other networks, for example.

Figure 3:
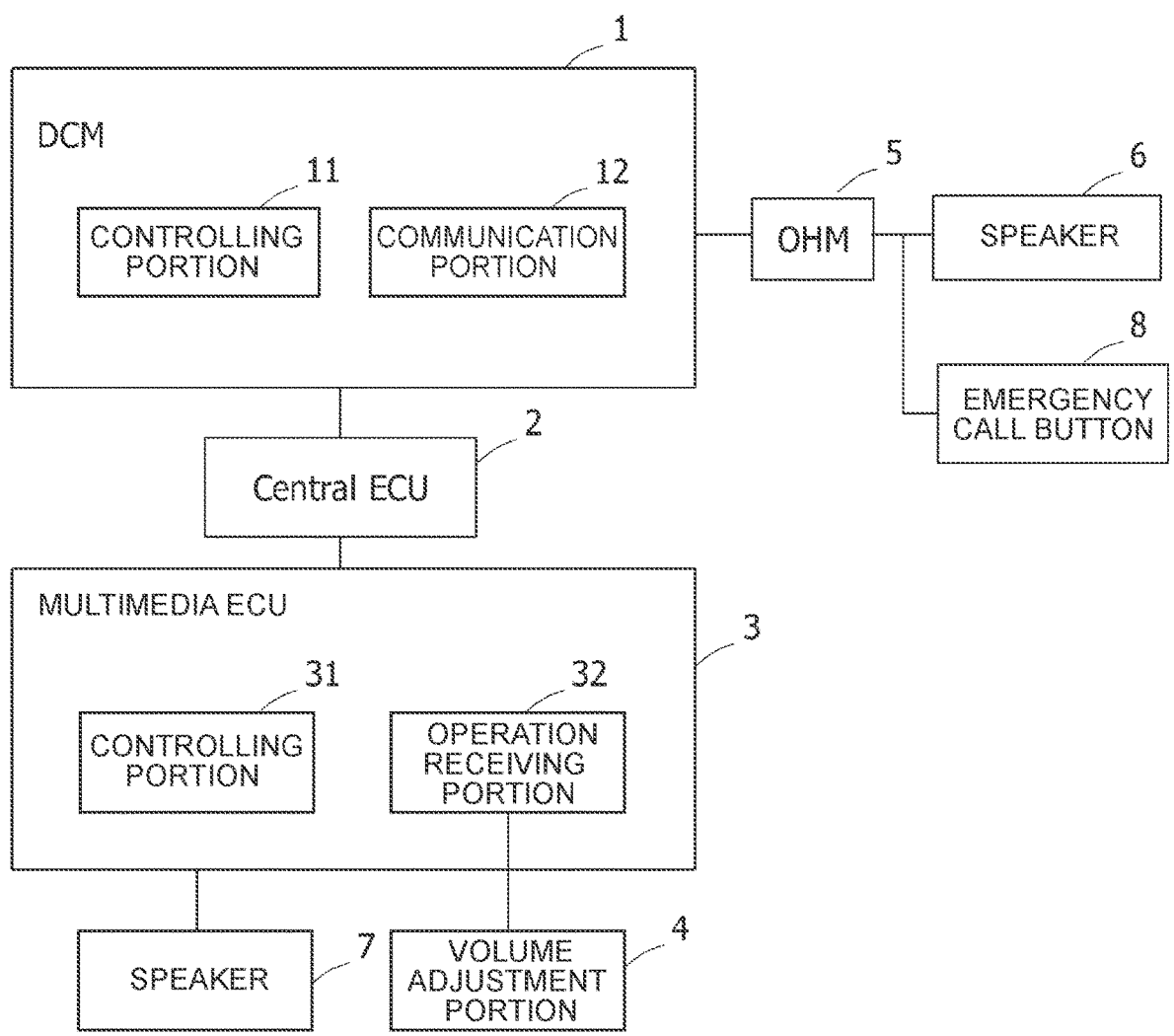
FIG. 3 is a view illustrating exemplary functional configurations of the DCM and the multimedia ECU.

FIG. 3 is a view illustrating exemplary functional configurations of the DCM 1 and the multimedia ECU 3. The DCM 1 includes a controlling portion 11 and a communication portion 12 as the functional configuration. These functional constituents are implemented by the CPU 101 of the DCM 1 executing the volume adjustment program, for example.

In a case where the controlling portion 11 detects the start of audio output from the DCM 1, the controlling portion 11 notifies the multimedia ECU 3 of the audio output start. The controlling portion 11 detects the start of audio output from the DCM 1 when communication with an external device is started, for example. The communication with the external device is started in the following cases, for example: a case where an emergency call to the center server 500 is performed; a case where communication is started by a user operation; a case where update of a program by Over-The-Air (OTA) is informed to a user; and a case where an emergency alert is received from the center server 500. An emergency call to the center server 500 is performed in the following cases, for example: a case where a pressing signal indicative of pressing of the emergency call button 8 is input from the OHM 5; and a case where the controlling portion 11 receives a notification indicating that a collision is detected by other devices in the vehicle 100. Further, other than the case where the communication with the external device is started, in a case where audio data stored in the DCM 1 is played, e.g., in a case where the DCM 1 performs guidance by audio when an emergency call is not performable due to an abnormality in the DCM 1, the start of the audio output from the DCM 1 is also detected.

Note that the case where the controlling portion 11 detects the start of audio output is not limited to the above cases. Further, the controlling portion 11 may detect the start of audio output based on a protocol type used for the communication. For example, in a case where communication is started by use of a protocol for streaming such as Real Time Streaming Protocol (RTSP), Microsoft Media Server (MMS), or HTTP Live Streaming (HLS), a protocol for audio call such as Session Initiation Protocol (SIP) or Real-time Transport Protocol (RTP), or the like, the controlling portion 11 may detect the start of audio output and may notify the multimedia ECU 3 of the audio output start.

In a case where the controlling portion 11 detects the end of audio output from the DCM 1, the controlling portion 11 notifies the multimedia ECU 3 of the audio output end. The end of audio output is detected in the following cases, for example: a case where the end of output audio data is detected; and a case where the communication with the external device is ended.

After the notification of the audio output start is output to the multimedia ECU 3 but before the notification of the audio output end is output to the multimedia ECU 3, the controlling portion 11 receives, from the multimedia ECU 3, input of a notification of a user operation to make a volume change that is input into the volume adjustment portion 4 and the content of the user operation. The controlling portion 11 changes the volume of the output audio data in accordance with the content of the user operation to make a volume change that is input from the multimedia ECU 3 and outputs the audio data the volume of which is adjusted to the OHM 5, so that the audio is output from the speaker 6.

The communication portion 12 is an interface communicating with the external device. One of the devices with which the DCM 1 communicates is the center server 500. The communication portion 12 transmits data input from the controlling portion 11 to the center server 500 and outputs data received from the center server 500 to the controlling portion 11. For example, when a pressing signal indicative of pressing of the emergency call button 8 is input from the OHM 5 to the controlling portion 11, the communication portion 12 performs an emergency call to the center server 500 in accordance with an instruction from the controlling portion 11.

The multimedia ECU 3 includes a controlling portion 31 and an operation receiving portion 32 as the functional configuration. These functional constituents are implemented, for example, when the processor 301 of the multimedia ECU 3 executes the DCM volume adjustment program.

The operation receiving portion 32 receives input of a user operation input into the volume adjustment portion 4. The user operation input into the volume adjustment portion 4 is a volume change. The content of the user operation to make a volume change includes, for example, an instruction to turn the volume up or down, and a value indicative of the amount of change. The amount of the volume change may be, for example, an increase-decrease value or may be a value indicative of a volume level after the change. The operation receiving portion 32 outputs a notification of the user operation to make a volume change and the content of the user operation to the controlling portion 31.

The controlling portion 31 receives, from the operation receiving portion 32, input of the notification of the user operation to make a volume change and the content of the user operation. In normal time, the controlling portion 31 changes the volume of audio data output from the controlling portion 31 in accordance with the content of the input user operation to make a volume change and outputs, to the speaker 7, the audio data the volume of which is changed.

The controlling portion 31 receives input of a notification of audio output start and a notification of audio output end from the DCM 1. During the time after the controlling portion 31 receives the notification of the audio output start from the DCM 1 but before the controlling portion 31 receives the notification of the audio output end from the DCM 1, when the controlling portion 31 receives, from the operation receiving portion 32, input of a notification of a user operation to make a volume change and the content of the user operation, the controlling portion 31 outputs the notification of the user operation to make a volume change and the content of the user operation to the DCM 1. The time after the controlling portion 31 receives the notification of the audio output start from the DCM 1 but before the controlling portion 31 receives the notification of the audio output end from the DCM 1 indicates the time during which the DCM 1 outputs audio.

Note that the functional configurations of the DCM 1 and the multimedia ECU 3 illustrated in FIG. 3 are examples, and the functional configurations of the DCM 1 and the multimedia ECU 3 are not limited to the configurations illustrated in FIG. 3.

Procedure of Process

Figure 4:
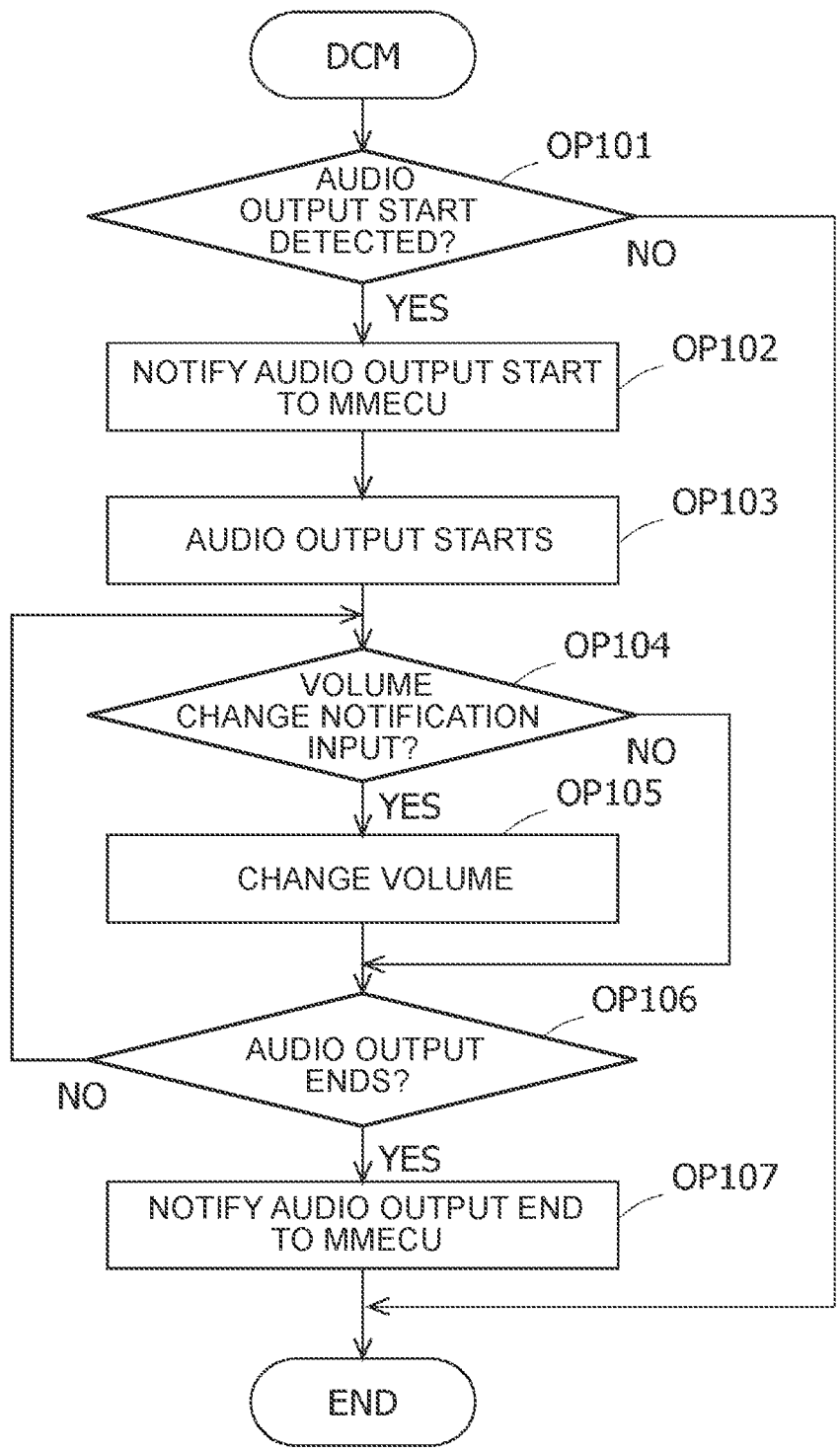
FIG. 4 is one example of a flowchart of a volume adjusting process in the DCM.

FIG. 4 is one example of a flowchart of a volume adjusting process in the DCM 1. The process illustrated in FIG. 4 is executed repeatedly with a predetermined cycle during the operation of the DCM 1, that is, during the operation of the vehicle 100. A main body that executes the process illustrated in FIG. 4 is the CPU 101, but the following description deals with the functional constituents as the main body for convenience.

In OP101, the controlling portion 11 determines whether or not the start of audio output by the DCM 1 is detected or not. In a case such as a case where the start of communication with the external device is detected or a case where the DCM 1 starts to play audio data, for example, an affirmative determination is made in OP101. In a case where the start of audio output by the DCM 1 is detected (OP101: YES), the process proceeds to OP102. In a case where the start of audio output by the DCM 1 is not detected (OP101: NO), the process illustrated in FIG. 4 is ended.

In OP102, the controlling portion 11 notifies the multimedia ECU 3 of the audio output start. In OP103, the controlling portion 11 starts to output audio data to the OHM 5, so that audio output from the speaker 6 is started. In FIG. 4, "MMECU" is an abbreviated designation of the multimedia ECU.

In OP104, the controlling portion 11 determines whether or not a notification of a user operation to make a volume change and the content of the user operation is input from the multimedia ECU 3. In a case where the notification of the user operation to make a volume change and the content of the user operation is input from the multimedia ECU 3 (OP104: YES), the process proceeds to OP105. In a case where the notification of the user operation to make a volume change and the content of the user operation is not input from the multimedia ECU 3 (OP104: NO), the process proceeds to OP106.

In OP105, since the notification of the user operation to make a volume change and the content of the user operation is input from the multimedia ECU 3, the controlling portion 11 changes the volume of the audio data in accordance with the content of the input user operation to make a volume change and outputs the audio data the volume of which is changed to the OHM 5. Hereby, the volume of the audio output from the speaker 6 is changed to the volume specified by the user operation.

In OP106, the controlling portion 11 determines whether or not the audio output by the DCM 1 is ended. For example, in cases such as a case where the communication with the external device is ended and a case where the played audio data is ended, an affirmative determination is made in OP106. In a case where the audio output by the DCM 1 is ended (OP106: YES), the process proceeds to OP107. In a case where the audio output by the DCM 1 is not ended (OP106: NO), the process proceeds to OP104.

In OP107, since the audio output by the DCM 1 is ended, the controlling portion 11 notifies the multimedia ECU 3 of the audio output end. After that, the process illustrated in FIG. 4 is ended.

Figure 5:
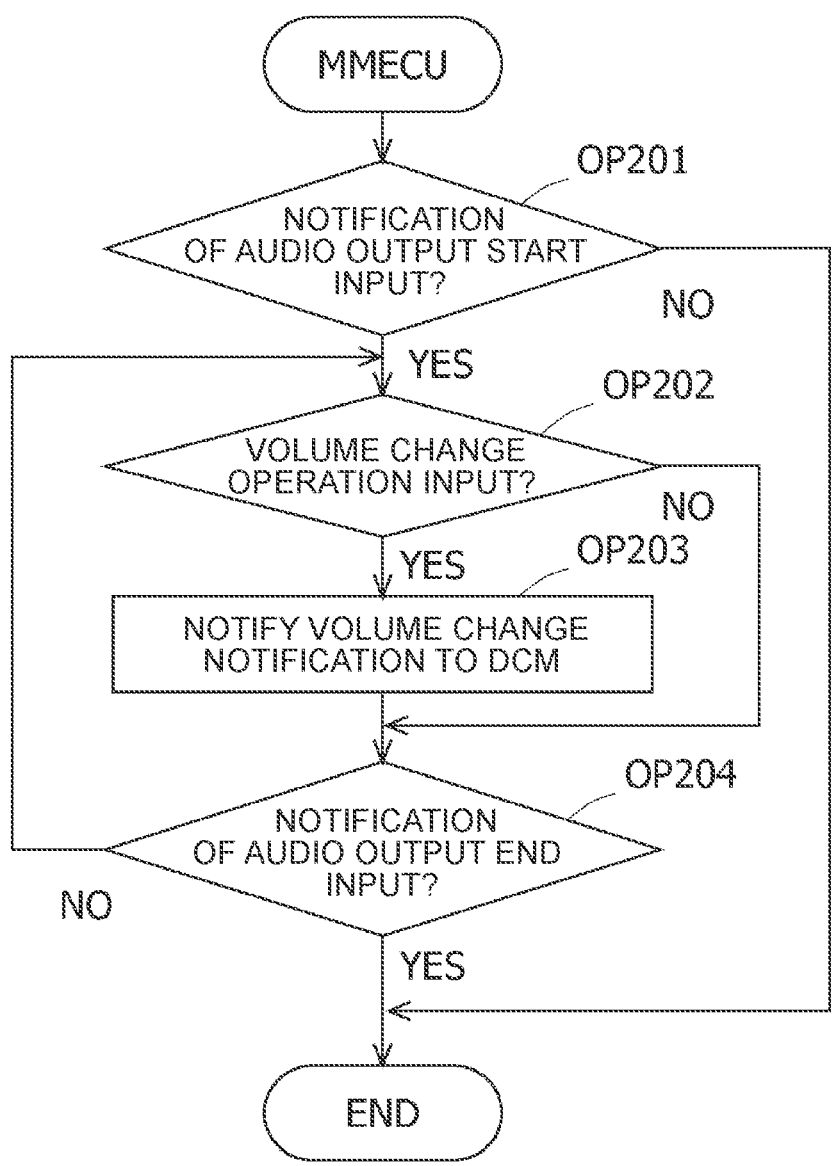
FIG. 5 is one example of a flowchart of a DCM volume adjusting process in the multimedia ECU.

FIG. 5 is one example of a flowchart of a DCM volume adjusting process in the multimedia ECU 3. The process illustrated in FIG. 5 is executed repeatedly at a predetermined cycle during the operation of the multimedia ECU 3, that is, during the operation of the vehicle 100. A main body that executes the process illustrated in FIG. 5 is the processor 301 of the multimedia ECU 3, but the following description deals with the functional constituents as the main body for convenience in FIG. 5.

In OP201, the controlling portion 31 determines whether or not the controlling portion 31 receives a notification of the audio output start from the DCM 1. In a case where the controlling portion 31 receives the notification of the audio output start from the DCM 1 (OP201: YES), the process proceeds to OP202. In a case where the controlling portion 31 does not receive the notification of the audio output start from the DCM 1 (OP201: NO), the process illustrated in FIG. 5 is ended.

In OP202, the controlling portion 31 determines whether or not the controlling portion 31 receives, from the operation receiving portion 32, input of a user operation to make a volume change that is input into the volume adjustment portion 4 and the content of the user operation. In a case where the controlling portion 31 receives, from the operation receiving portion 32, input of the user operation to make a volume change and the content of the user operation (OP202: YES), the process proceeds to OP203. In a case where the controlling portion 31 does not receive, from the operation receiving portion 32, input of the user operation to make a volume change and the content of the user operation (OP202: NO), the process proceeds to OP204.

In OP203, the controlling portion 31 notifies the DCM 1 of the user operation to make a volume change that is input into the volume adjustment portion 4 and the content of the user operation. In OP204, the controlling portion 31 determines whether or not the controlling portion 31 receives a notification of the audio output end from the DCM 1. In a case where the controlling portion 31 does not receive the notification of the audio output end from the DCM 1 (OP204: YES), the process illustrated in FIG. 5 is ended. In a case where the controlling portion 31 does not receive the notification of the audio output end from the DCM 1 (OP204: NO), the process proceeds to OP202.

Figure 6:
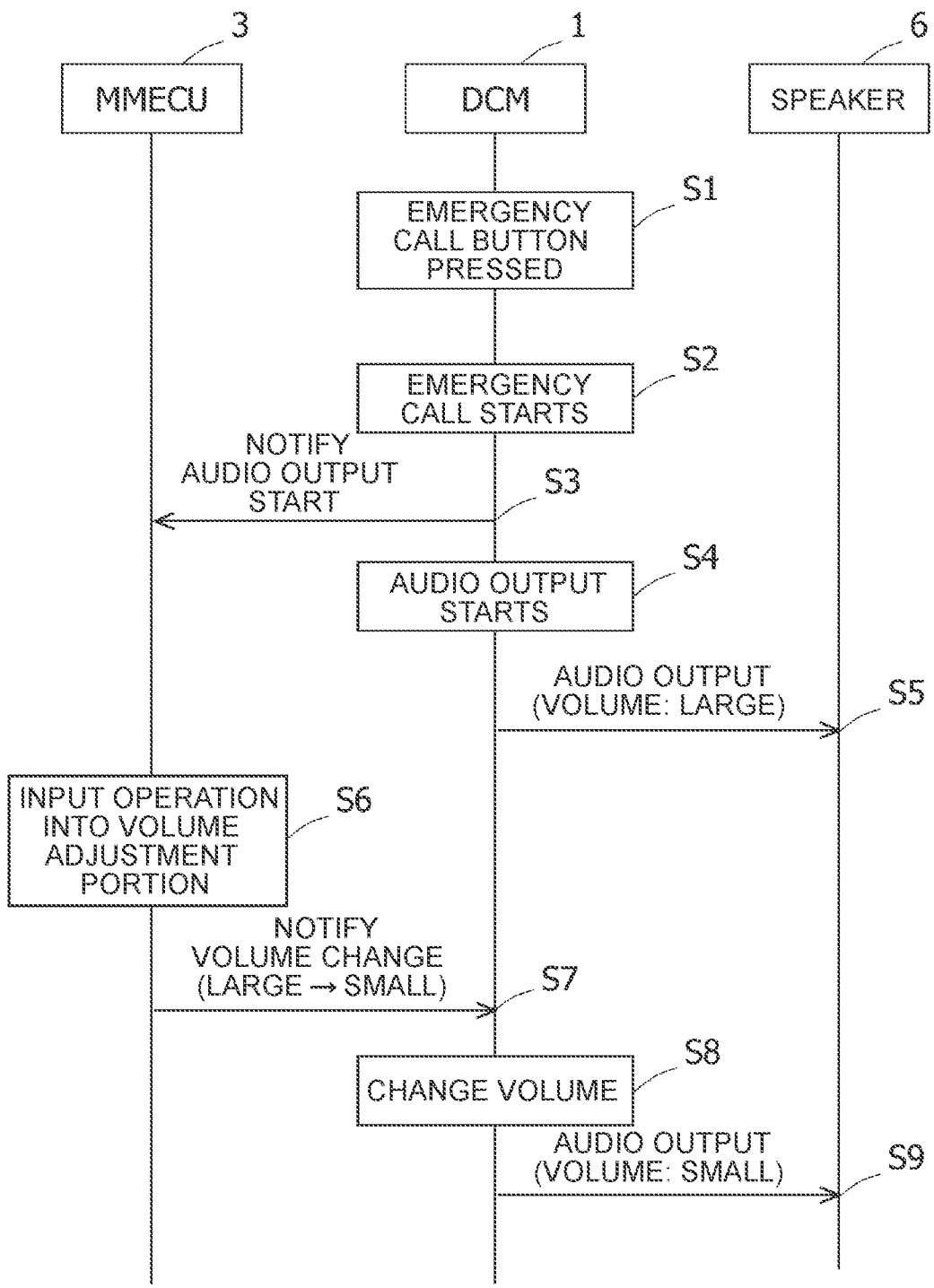
FIG. 6 is a view illustrating one example of a processing sequence in a vehicle 100 for a volume change process for audio output from the DCM according to the first embodiment.

FIG. 6 is a view illustrating one example of a processing sequence in the vehicle 100 for a volume change process of changing the volume of audio output from the DCM according to the first embodiment. FIG. 6 deals with a case where an emergency call is performed when an occupant of the vehicle 100 presses down the emergency call button 8.

In S1, the emergency call button 8 of the DCM 1 is pressed down by the occupant of the vehicle 100. In S2, the DCM 1 starts the emergency call to the center server 500 in response to the pressing of the emergency call button 8. Hereby, the communication is started, so that the DCM 1 detects the audio output start (FIG. 4, OP101: YES). When the emergency call is performed from the DCM 1 to the center server 500, a conversation between an operator in the center server 500 and the occupant in the vehicle 100 is started via the DCM 1 so as to check the situation, for example.

In the multimedia ECU 3, the DCM 1 notifies the multimedia ECU 3 of the audio output start (FIG. 4, OP102). The multimedia ECU 3 receives the notification of the audio output start from the DCM 1 (FIG. 5, OP201: YES). In S4, the DCM 1 starts to output audio from the speaker 6 (FIG. 4, OP103). In S5, the audio is output from the speaker 6. The volume of the audio output at this time is set to a default value, for example, and it is assumed that the volume is set to a large level among three levels of the large level, a medium level, and a small level. Note that the audio output in S6 is the voice of the operator that is received from the center server 500, for example.

In S6, for example, the volume of the audio output from the speaker 6 is too large, and the occupant in the vehicle 100 operates the volume adjustment portion 4 to change the volume to the small level among the three levels of the large level, the medium level, and the small level. The multimedia ECU 3 receives a user operation to make a volume change that is input into the volume adjustment portion 4 (FIG. 5, OP202: YES). In S7, the multimedia ECU 3 notifies the DCM 1 of the user operation to make a volume change and the content of the user operation (FIG. 5, OP203). The DCM 1 receives the notification of the user operation to make a volume change and the content of the user operation from the multimedia ECU 3 (FIG. 4, OP104: YES). Note that the content of the user operation to make a volume change that is notified to the DCM 1 in S7 is to change the volume to the small level.

In S8, the DCM 1 changes the volume of audio data to be output to the small level (FIG. 4, OP105). In S9, the audio the volume of which is changed to the small level is output from the speaker 6. After that, the user operation to make a volume change that is input into the volume adjustment portion 4 and the content of the user operation are notified from the multimedia ECU 3 to the DCM 1 until the conversation between the occupant in the vehicle 100 and the operator in the center server 500 is ended.

Operations and Effects of First Embodiment

In the first embodiment, a user operation to make a volume change that is input into the volume adjustment portion 4 and the content of the user operation are notified from the multimedia ECU 3 to the DCM 1 while audio is being output from the DCM 1, and the DCM 1 changes the volume of audio data in accordance with the content of the notified user operation to make a volume change. Hereby, the volume of the audio output from the DCM 1 can be changed by the user in the vehicle 100.

OTHER EMBODIMENTS

The above embodiment is just one example, and this disclosure can be carried out with various modifications within a range that does not deviate from the gist of the disclosure.

The hardware configuration in the vehicle 100 is changed appropriately depending on the type of the vehicle 100. For example, in the first embodiment, the vehicle 100 includes the C-ECU 2, but the technology described in the first embodiment can be also applied to a vehicle that does not include the C-ECU 2. Further, how the speaker used by the DCM 1 is connected to the DCM 1 is also changed appropriately depending on the configuration of the vehicle 100. In the first embodiment, the speaker 6 used by the DCM 1 is provided. However, this disclosure is not limited to this, and the DCM 1 and the multimedia ECU 3 may share the speaker 7, for example. Even in a case where the DCM 1 and the multimedia ECU 3 share the speaker 7, the user can operate the audio output from the DCM 1 by the multimedia ECU 3 notifying the DCM 1 of a user operation to make a volume change and the content of the user operation as described in the first embodiment.

The processes and the means described in this disclosure can be combined freely as long as no technical inconsistency occurs.

Further, a process described as a process to be executed by one device may be divided and executed by a plurality of devices. Alternatively, processes described as processes to be executed by different devices may be executed by one device. In a computer system, which hardware configuration (server configuration) is employed to implement each function is changeable flexibly.

This disclosure can be achieved in such a manner that a computer program having the functions described in the above embodiment is supplied to a computer, and one or more processors provided in the computer reads and executes the program. Such a computer program may be provided to the computer by a non-transitory computer-readable storage medium connectable to a system bus of the computer or may be provided to the computer via a network. Examples of the non-transitory computer-readable medium include a disk of a given type such as a magnetic disk (a floppy (registered trademark) disk, a hard disk drive (HDD), and the like) or an optical disk (CD-ROM, DVD disc, Blu-ray disc, or the like), a reading only memory (ROM), a random access memory (RAM), an EPROM, an EEPROM, a magnetic card, a flash memory, an optical card, and a medium of a given type that is suitable to store an electronic order.

What is claimed is:

1. An information processing device comprising:
   a controlling portion, including a processor and a memory storing a program, provided in a vehicle;
   at least one interface connected to the controlling portion, a volume adjustment portion, and a first speaker in the vehicle, wherein the volume adjustment portion is configured to make a volume change of audio output from the first speaker;
   wherein the controlling portion is configured to:
   determine whether a notification of audio output start is received from a data communications device that is not connected to the volume adjustment portion, wherein the data communications device outputs audio from a second speaker;
   via the at least one interface, receive a user operation input into the volume adjustment portion; and
   based upon a determination that the controlling portion received the notification of audio output start from the data communications device, change a target of the volume change from the information processing device that is connected to the volume adjustment portion to the data communications device that is not connected to the volume adjustment portion,
   while the data communications device outputs audio from the second speaker, notify the data communications device of the volume change made by the user operation input into the volume adjustment portion,
   wherein the data communications device is configured to communicate with a center server via a network, the data communications device is provided in the vehicle where the first speaker is provided, and the controlling portion notifies the data communications device via a central processing unit that is connected to each of the information processing device and the data communications device,
   wherein the notification of audio output is started when at least one of the following occurs: an emergency call to the center server is performed, communication with the center server is started by a user operation, an update of a program by Over-The-Air is informed to a user, and an emergency alert is received from the center server.

2. The information processing device according to claim 1, wherein, in a case where the controlling portion receives a notification of audio output end from the data communications device, the controlling portion stops notifying the data communications device of the volume change made by the user operation input into the volume adjustment portion.

3. The information processing device according to claim 1, wherein, while the audio is output from the first speaker, the controlling portion further executes changing the volume of the audio output from the first speaker in accordance with the volume change made by the user operation input into the volume adjustment portion.

4. A vehicle comprising:
a first speaker;
a volume adjustment portion configured to make a volume change of audio output from the first speaker;
a second speaker;
a data communications device connected to the second speaker to output audio from the second speaker, and not connected to the volume adjustment portion; and
an information processing device connected to the first speaker, wherein the information processing device is configured to:
determine whether a notification of audio output start is received from the data communications device;
receive a user operation input into the volume adjustment portion; and
based upon a determination that the information processing device received the notification of audio output start from the data communications device, change a target of the volume change from the information processing device that is connected to the volume adjustment portion to the data communications device that is not connected to the volume adjustment portion,
while the data communications device outputs audio from the second speaker, notify the data communications device of the volume change made by the user operation input into the volume adjustment portion,
wherein the data communications device is configured to communicate with a center server via a network, and the data communication device changes volume of the audio output from the second speaker in accordance with the notified volume change received from the information processing device via a central processing unit that is connected to each of the data communications device and the information processing device,
wherein the notification of audio output is started when at least one of the following occurs: an emergency call to the center server is performed, communication with the center server is started by a user operation, an update of a program by Over-The-Air is informed to a user, and an emergency alert is received from the center server.

5. The vehicle according to claim 4, wherein:
in a case where the data communications device ends the output of the audio, the data communications device outputs a notification of the audio output end to the information processing device; and
in a case where the information processing device receives the notification of the audio output end from the data communications device, the information processing device stops notifying the data communications device of the volume change made by the user operation input into the volume adjustment portion.

6. The vehicle according to claim 4, wherein, in a case where the audio is output from the first speaker, the information processing device further executes changing the volume of the audio output from the first speaker in accordance with the volume change made by the user operation input into the volume adjustment portion.

7. The vehicle according to claim 4, wherein:
the data communications device includes an emergency call button; and
when the emergency call button is pressed down, the data communications device starts to communicate with an external device.

8. An information processing method using an information processing device connected to a volume adjustment portion that adjusts a volume output of a first speaker associated with the information processing device, and a data communications device that is not connected to the volume adjustment portion, wherein each of the information processing device and the data communications device is provided in a same vehicle, comprising:
the information processing device determining whether a notification of audio output start is received from the data communications device, wherein the data communications device outputs audio from a second speaker;
the information processing device receiving a user operation input into the volume adjustment portion;
based upon the determination that the information process device received the notification of audio output start from the data communications device, changing a target of the volume change from the information processing device that is connected to the volume adjustment portion to the data communications device that is not connected to the volume adjustment portion;
while the data communications device outputs audio from the second speaker, the information processing device notifying the data communications device of the volume change made by the user operation input into the volume adjustment portion thereby causing the data communications device to change the volume output from the second speaker;
the data communications device communicating with a center server via a network; and
the data communications device changing volume of the audio output from the second speaker in accordance with the notified volume change received from the information processing device via a central processing unit that is connected to each of the data communications device and the information processing device,
wherein the notification of audio output is started when at least one of the following occurs: an emergency call to the center server is performed, communication with the center server is started by a user operation, an update of a program by Over-The-Air is informed to a user, and an emergency alert is received from the center server.

9. The information processing method according to claim 8, comprising:
in a case where the data communications device ends the output of the audio, the data communications device outputting a notification of the audio output end to the information processing device; and
in a case where the information processing device receives the notification of the audio output end from the data communications device, the information processing device stopping notifying the data communications device of the volume change made by the user operation input into the volume adjustment portion.

10. The information processing method according to claim 8, comprising, in a case where the information processing device outputs the audio from the first speaker, the information processing device further executing changing the volume of the audio output from the first speaker in accordance with the volume change made by the user operation input into the volume adjustment portion.

11. The information processing method according to claim 8, comprising, in a case where the data communications device detects an emergency event, the data communications device starting to communicate with an external device.

* * * * *